United States Patent [19]

Gerard et al.

[11] Patent Number: 4,669,077
[45] Date of Patent: May 26, 1987

[54] PROCESS AND SYSTEM FOR OPTICAL RECORDING AND READING ON A MOBILE DATA CARRIER

[75] Inventors: Jean-Louis Gerard; Pierre Berthet; Claude Bricot; Michel Audoin, all of Paris, France

[73] Assignee: Thomson-CSF, Paris, France

[21] Appl. No.: 771,269

[22] Filed: Aug. 30, 1985

Related U.S. Application Data

[62] Division of Ser. No. 503,655, Jun. 13, 1983, Pat. No. 4,561,082.

[30] Foreign Application Priority Data

Jun. 15, 1982 [FR] France .................... 82 10407

[51] Int. Cl.$^4$ ............................................. G11B 7/007
[52] U.S. Cl. ..................................................... 369/275
[58] Field of Search ............. 369/44, 45, 46, 111, 369/275, 47, 48, 276, 109, 110; 346/762, 135.1

[56] References Cited

U.S. PATENT DOCUMENTS

| | | | |
|---|---|---|---|
| 4,094,013 | 6/1978 | Hill et al. | 369/111 |
| 4,325,135 | 4/1982 | Dil et al. | 369/110 |
| 4,428,075 | 1/1984 | Hazel et al. | 369/45 |
| 4,443,870 | 4/1984 | Hazel et al. | 369/44 |
| 4,553,228 | 11/1985 | Gerard et al. | 369/46 |
| 4,562,564 | 12/1985 | Bricot et al. | 369/44 |

*Primary Examiner*—Donald McElheny, Jr.
*Attorney, Agent, or Firm*—Oblon, Fisher, Spivak, McClelland & Maier

[57] ABSTRACT

A process and device for focussing a light energy beam on a data carrier comprising sites fromed of virgin areas free from any data recording provided along tracks and serving as reference plane for said focussing. In a preferred variation, these areas are preceded by flags associated with a specific code. Control is achieved by measuring the deviation between the plane of focussing of a beam into a spot scanning the tracks and the reference plane formed by the surface of the virgin areas. Between two passages of these areas of the measurements are stored. The focussing error signal is obtained by filtering these measurements.

6 Claims, 11 Drawing Figures

PROCESS AND SYSTEM FOR OPTICAL RECORDING AND READING ON A MOBILE DATA CARRIER

This is a division, of application Ser. No. 503,655, filed June 13, 1983 now U.S. Pat. No. 4,561,082.

BACKGROUND OF THE INVENTION

1. Field of the Invention

The present invention relates to a process for focussing a light energy beam on a reference plane of a data carrier, particularly a carrier in disk form on which the data is recorded along tracks in the form of disturbances detectable by optical means. The invention also relates to an optical device for implementing this process as well as the carrier used for this purpose.

2. Description of the Prior Art

Numerous optical systems for recording and/or reading data along tracks have been described in the prior art. when it is a question of recording data sequentially, for example video data, the tracks are generally not given material form in advance but are rather created in real time at the time of recording. The data is recorded along tracks having the form of a single spiral extending from the peripheral zone of the disk to a central zone or in the reverse direction, or else having the form of concentric circles centered on the axis of rotation of the disk.

In all these systems, arrangements must be made for ensuring correct radial tracking of the tracks during writing and/or reading, and first of all these tracks must be created in one way or another.

In the simplest systems, the accuracy of the drive means for the recording head are relied on to create these tracks at the same time as the data is written, the tracks being defined simple by the presence of these data. During reading, data written for example in the form of micro-reliefs, interfere with a reading beam focussed in the plane of the recording face of the disk. THe passage of these micro-reliefs under the focussing spot modulates the beam and this modulation is detected by means of photoelectric cells converting the light intensity variations into electric signals. these electric signals may also be used for following the tracks.

The process which has just been described requires a very great mechanical stability in the advance of the recording head in order that two successive grooves do not overlap or at least so that they are not poorly discernable during reading. To improve the system which has just been described, a process has been proposed in the patent application U.S. Pat. No. 4,275,275 using the last written track or one of the previously written tracks as reference.

However, when it is desired to record data in a random fashion, for example in applications relating to data processing, it is generally necessary to materialize the tracks in advance along which data may be recorded. For this, it is usual to create a pre-etching in any form whatsoever. In an embodiment described in patents U.S. Pat. No. 4,252,889, U.S. Pat. No. 4,188,510 and U.S. Pat. No. 4,334,007, during manufacture of the carrier, the tracks are materialized in the form of a smooth groove created in an auxiliary layer of this carrier. These tracks may be detected even in the absence of any data recording, this recording being effected during a later phase in a photosensitive or heat sensitive layer in contact with the auxiliary layer.

In a preferred variation of the prior art, the preetched tracks may be emerged with the regions in which the data is recorded. Then a so-called monotrack system is obtained.

In other processes, the pre-etched track(s) are distinct from the tracks along which the data is written, then socalled dual track or multi track systems are obtained.

The main drawback of the process which has just been described is that it does not allow maximum recording density since it requires, at least, an additional pre-etching track for a pre-etched data track. In addition, it requires the use of two beams, one for radially following the preetched track and the other for writing or reading data on the track intended for recording.

Carriers of the so-called mono-track type, comprising a pre-etching, are not free either of disadvantages. They generally require the use of two beams, one for recording and the other for radial tracking. Furthermore, although the preetched track may be readily discernable from the rest of the disk (intertrack zones) in the absence of data recording, such is not the case when data is recorded. The result may be, if precautions are not taken, inversions of contrast leading to tracking errors.

To palliate these disadvantages, a radial tracking device has been proposed using a data carrier comprising a pre-etching used for this tracking formed solely by discrete or "flag" elements spaced along the tracks.

Given effect in several variations, the pre-etching is formed by a succession of discrete non contiguous elements materializing the main axis of the tracks. The spatial distribution of these discrete elements may be uniform or not. In a first variation, each discrete element is formed by a smooth track section. In a second variation, each discrete element comprises several sections defining a particular code. In other variations, each element comprises one or more portions offset with respect to the mean axis. Finally, each of the pre-etching elements may be itself preceded by an auxiliary pre-etcing element used for synchronization purposes. The track following device comprises photodetector means, measuring circuits comprising for example sampler-disablers or integrating memory circuits and sampling circuits. A radial tracking error signal is elaborated from the evolution of the signals detected during successive passages through a zone of the surface of the disk illuminated by a tracking spot.

In addition to correct tracking ensured preferably by the process which has just been described, a second requirement associated with the reading or writing of data on an optical carrier, concerns the focussing of the light energy beams used. These beams must be focussed on the carrier in a spot which must permanently follow the fluctuations in level of the tracks. For this, it is known that correct focussing of the beam is obtained by means of a focussing control device comprising a feedback loop keeping the distance between the optial device and the etched surface of the carrier constant. Locking on and maintenance of the control device in position are obtained by detecting the fluctuations of an electric signal derived, in a first variation, from reading the recorded data and, in a second variation, from detecting the pre-etching materializing the tracks, for example in the form of a smooth groove.

We then come up against the same difficulties as before recalled in connection with radial tracking.

It has also been proposed to use the same discrete preetching elements, in their variations comprising sections offset with respect to the mean axis of the tracks, also for ensuring focussing.

Although this process dissociates focussing from the recorded data content, accidental disturbances of the structure of the pre-etching elements play however a role in the quality of the focussing even if this role is not determining. Furthermore, the quality of the focussing is influenced by possible losses of signal due to the transitory non detection of these elements or "drop-outs", for different reasons related to the quality of the carrier and/or of the opto-electronic detection means of the pre-etching elements.

SUMMARY OF THE INVENTION

The aim of the invention is to palliate the drawbacks of the prior art. For this, there is provided along the tracks virgin zones free of any recording including that in the form of discrete pre-etching elements or smooth track sectons such as has just been described. These zones are then formed by virgin areas of the surface of the disk. Now, it has been discovered experimentally that the surface of the disks have less anomalies likely to result in parasite fluctuations of the focussing than the structures of the recorded element used in the prior art for this purpose.

The invention takes advantage of this phenomenon and the focussing process thereof consists in deriving the signals required for vertically controlling a writing and/or reading head, i.e. for correct focussing of a light energy beam on a reference surface, and detecting these virgin zones by means of opto-electronic detection means.

The invention therefore has as object a process for controlling the vertical position of a scanning spot of a beam intended to be focussed in a reference plane of a mobile data carrier; the data being recorded along tracks arranged in a given configuration; the process being used in an optical data transcription apparatus comprising at least one radiant energy source associated with a lens for focussing said beam and opto-electronic signal detection and processing means collecting a radiation emerging from the portion of said reference surface illuminated by the scanning spot and converting the radiation into an electric signal representing the instantaneous deviation between the position of the focussing plane and the position of the reference plane; said process comprising the following steps:

provision along said tracks in a given spatial configuration of discrete sites formed of virgin areas free of any recording of said data, whose surfaces define said reference plane end of dimensions greater than that of the scanning spot focussed in this reference plane, generation of a signal defining a time window, in synchronism with the passage of said areas through said zone illuminated by the scanning spot, measurement of the signal representing the instantaneous deviation between the position of the focussing plane and that of the reference plane during these time windows and storage of this measurement during the time interval separating two signals defining the time windows, and generation of a focussing error signal by electric filtration of the values of said successively measured and stored deviations.

The invention also has as object an optical device for focussing a light energy beam using this process as well as a disk used by such a device and the carrier used for this purpose.

BRIEF DESCRIPTION OF THE DRAWINGS

The invention will be better understood and other features will appear from the following description with reference to the accompanying figures in which.

DETAILED DESCRIPTION OF THE INVENTION

Since the invention relates to a focussing process and device in a system using a data carrier of a pre-etched type, it is useful to recall the main components of an optical system for writing and/or reading data carriers, more especially carriers in the form of optically readable and writable disks.

Figure 1:
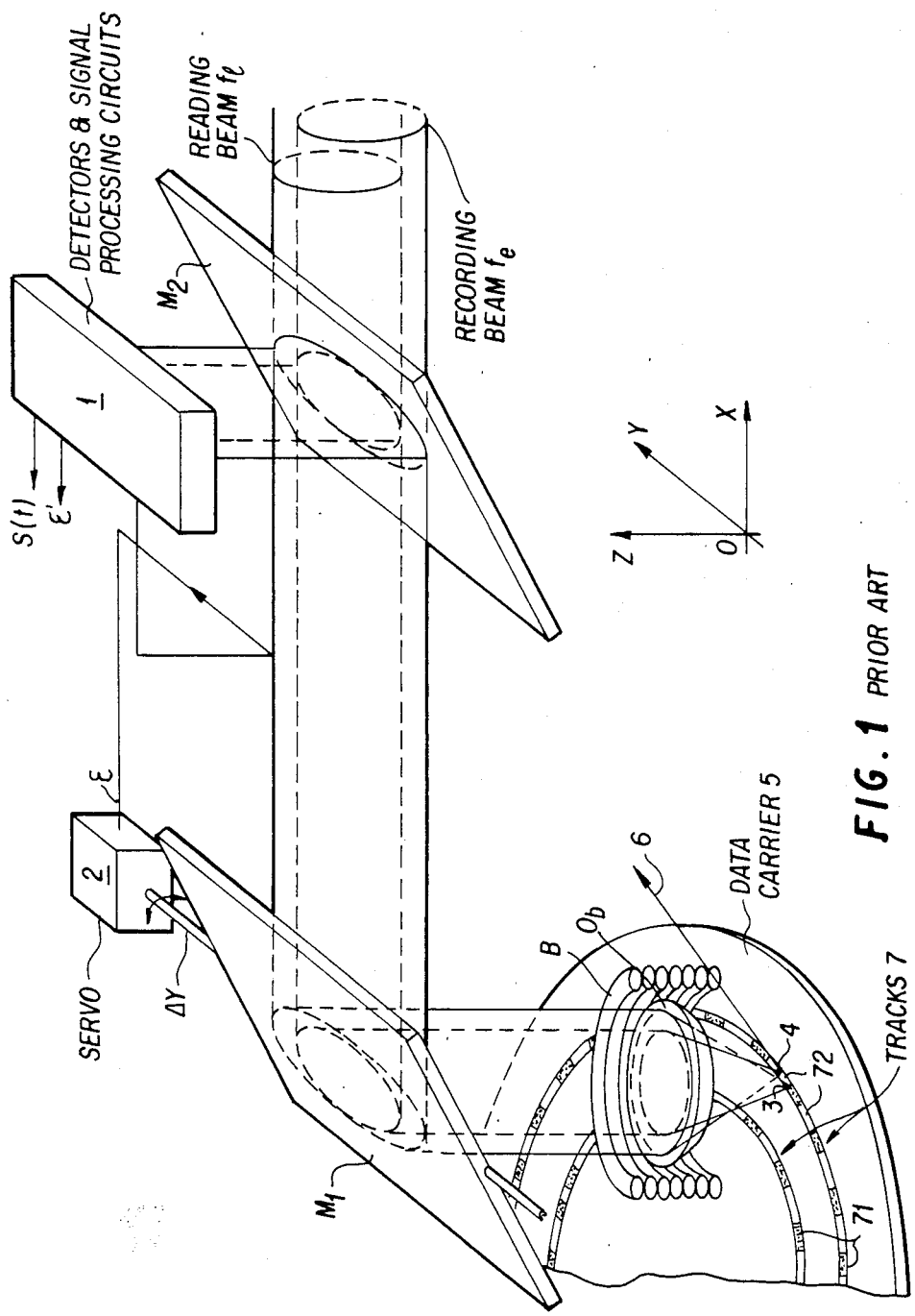
FIG. 1 represents a disk of the prior art and a device for following the track and focussing such a beam on the disk.

FIG. 1 shows a data carrier 5 of the prior art in the form of a circular disk rotatable in a plane XOY about an axis parallel to the third axis of a reference trihedron XYZ. The lower face of this disk is here assumed to be smooth; the upper face which is parallel thereto is also smooth, but comprises a pre-etched track 7 in the form of a smooth track whose substantially constant width is of the order of or less than a micrometer.

Such a disk may be used either for writing data at a given point of one of the smooth previously inscribed tracks or for reading data written at any point in this track. The disk, for example of a diameter of about 30 cm, is driven with a rotary movement communicated by a drive motor secured to the frame of the optical writing-reading system. In this embodiment, the device for acceding to a predetermined track of the disk comprises a fixed part having two light energy sources (not shown in FIG. 1) and a mobile part formed by the writing-reading head. As is known, this latter comprises a lens of the microscope type $O_b$, integral with an electromagnetic coil B moving in the magnetic field of a permanent magnet (not shown) providing the vertical control and a galvanometric mirror $M_l$ providing radial control. The light energy sources, as is also known, comprise laser sources, for example HeNe gas or semiconductor lasers. The gas lasers deliver a polarized parallel beam whose cross section is very small. The laser beam must be enlarged so as to cover the inlet pupil of the lens, whatever the position of the lens along the optical axis. To comply with this requirement, the patent application U.S. Ser. No. 174,564 filed on 3rd Aug. 1979 has proposed an afocal type optical system between the light energy sources and the mobile writing-reading head.

For reading, a parallel laser beam $f_l$ produced by a laser source (not shown in FIG. 1) is enlarged by means of an afocal lens, whose enlargement is such that the emergent beam, also parallel, covers the inlet pupil of lens $O_b$. Mirror $M_l$ deflects the rays which are propagated parallel to a direction parallel to axis OX in a direction substantially parallel to axis OZ. Lens $O_b$ focusses the reading beam at a point 3 on the data carrying disk 5. This disk is driven with a rotary movement shown symbolically by arrow 6. The lens and the mirror are integral with a mobile assembly forming the writing-reading head. The advance of this mobile assembly may be obtained by any known means.

The same afocal lens is then used for the writing beam $f_e$, this latter having been previously modulated. So as to differentiate the reading and writing spots on the disk, the writing beam $f_e$ is slightly slanted with respect to the reading beam $f_l$ so that the off-centering of the writing beam on the inlet pupil of the lens is very limited and so that the movement of the beam during radial movement of the head can be neglected. It follows that whatever the position of the lens along the optical axis, the writing beam is focussed at the focal center of the lens. The writing spot is focussed at point 4.

For writing digital data, tracks 7 are preferably arranged int he form of concentric circles. They may be materialized or not before any data is written by a preetching in the form of "smooth" grooves. The width of the track elements is chosen slightly less than the diameter of the light spot and these elements are separated by intertrack areas whose width is slightly greater than the width of the track. The upper surface of the carrier is given a thin layer appropriate for writing by a thermo-optical process. In so far as the writing phase of the disk is concerned, illumination of the sensitive layer serving for writing is provided by a spot 4 whose intensity is modulated for example by an electric signal formed by square waves of variable or constant width depending on the applications which form the data carrier. Incorporation of data in the modulating signal is provided, depending on the case, by frequency or phase modulation, or by any method of coding capable of providing a pulsed coded message; the data may also be itself directly the modulating signal.

To detect the reading beams reflected by the disk, a semitransparent plate $M_2$ is for example placed in the path of the beam $f_l$. The reflected beam is then sent to photodetecting and signal processing means which may deliver, on the one hand, an error signal for controlling the motor 2 steering the position of mirror $M_1$, thus forming a radial control and, on the other hand, an error signal $\epsilon'$ for controlling the coil B integral with lens $O_b$, thus forming a focussing control.

The processing means also deliver a signal S(t) representative of the useful information recorded on the disk. In fact, as the element recorded in tracks 7 travel past, a signal S(t) is collected during reading which faithfully translates the variations in time of the signal written on the track.

In the writing phase, the reading beam $f_l$ may be used for providing radial control by means of the pre-etching but may also be used for the purpose of monitoring the data in real time during writing.

In a preferred variation of the prior art, the preetching used for radial tracking is in the form of discrete elements or "flags" 71 which alone define the mean axis of the track to be followed. This track is then virtual. Considering the speed of rotation of the disk, the spatial distribution of these pre-etching elements must be sufficient to satisfy SHANNON's criterion: typically on a disk of 30 cm in diameter in which a ring 8 cm wide represents the useful recording zone, about 40000 tracks are available and each comprises about 3500 flags.

These flags define zones 72 intended for recording useful information data.

Figure 2:
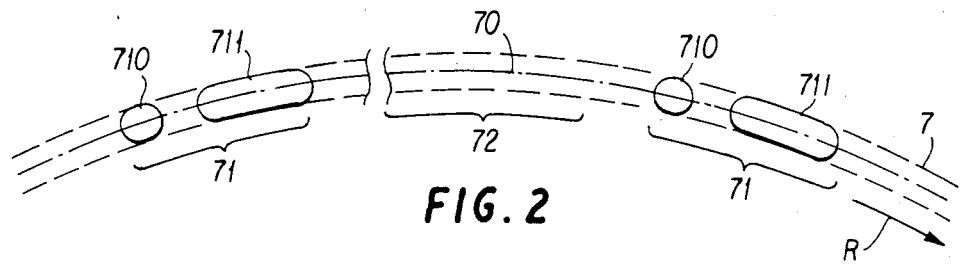
FIGS. 2 and 3 show a disk pre-etching in serveral embodiments.

FIG. 2 illustrates one embodiment among others of flags 71 defining the mean axis 70 of track 7 along which the data may be written. As has just been recalled, between two identical flags 71, there exists a zone 72 intended for recording useful information data. The direction of rotation of the disk has been shown in FIG. 2 by arrow R.

It should of course be understood that track 7 shown in the figure is a virtual track whose mean axis 70 represents the ideal path which a writing beam must follow. It may however be materialzed in some applications by a "smooth" groove before recording in zones 72. The signals required for radial control of the writing head will be derived from the detection of flags 71 by tracking means which will be described in more detail further on. When the pre-etching elements 71 travel under the focussing spot of a reading beam or, as will be described in detail further on, the writing beam, a tracking signal may be generated in a conventional way. The signal processing means must however store the measurement for the period of time elapsing between two passages of successive flangs in the zone illuminated by the tracking spot. According to the invention, the control signal may be derived from the evolution of the signal measured and these two moments.

It is also necessary, if it is desired to record data only in the useful zone 72 located between two successive flags 71, to inhibit the writing beam when one of these flags is in the zone illuminated by the writing spot. The discrimination between the flags and the information recorded between two flags may be facilitated if these flags are given a structure allowing them to be identified selectively or if each flag is associated with an additional coded synchronizing flag.

FIG. 2 illustrates one of these possibilities. Each flag 71 is divided into several sections 710, 711 whose length and spatial distribution define a code allowing a flag to be identified without ambiguity. To improve the quality of the radial control, it is also known to wobbulate the tracking beam by imparting thereto a slight fixed frequency oscillation on each side of the mean axis of the track. This wobbulation may be created in another way by means of patterns which are assymetric with respect to the tracking axis 70. For this, each flag comprises in addition to one or more sections centered on the mean axis of the track and indicating the beginning of a flag, one or more other sections offset with respect to this mean axis. In a variation, the simplest, shown in FIG. 3, a first flag 71 comprises a section 710 centered on the mean axis of track 70 and a second section 711-G offset to the left of this axis. The next flag 71' also comprises a first section 710 centered on the mean axis 70 and a second section 711-D offset to the right of this axis. This succession is repeated. The deviation between the offset sections and axis 70 of the track is of the order of a fraction of the width of the tracking spot.

In other variations, not shown, each flag comprises at least one section offset to the left and one section offset to the right.

If a writing configuration in the form of a block is desired, the spatial distribution of 71, 71' is preferably uniform.

These flags may also be used, at least if some flag variations are used, to generate the signal $\epsilon'$ required for ensuring correct focussing of the track scanning spot on a given plane of the disk.

Generally, the pre-etching elements 71, as well moreover as the etching corresponding to the data written in zone 72, is in the form of disturbances of the heat sensitive layers, as hollows or bosses. Very often two level are thus defined, one possibly merging with the plane defined by the surface of the superficial layer of the heat sensitive material before any recording, i.e. also with the plane of the intertrack zones. One of the logic states "1" or "0" is associated with these two levels.

In the oldest monotrack systems or the prior art, the signal $\epsilon'$ is disturbed by reading of the recorded data even if the tracks are provided with pre-recorded smooth grooves. In fact, subsequent recording of information data tends to reduce the contrast which exists between the pre-recorded zones in the form of a smooth groove and the intertrack zones and may even, in extreme cases, reverse it. These parasite effects may lead to the vertical control of lens $O_b$ falling out of step.

Although a more recent process of the prior art which consists in decoupling the focussing from the configuration of the recorded data, which is by nature uncertain, and in generating signals from flags with a better defined structure and whose distribution along the tracks may, in a preferred variation, be uniform, leads to better results, it is still possible to improve the quality of the focussing and this is the aim of the present invention.

In fact, drop-outs remain possible and, as has been recalled, it has been found experimentally that the surface state of the virgin recording zones is statistically less disturbed than the planes defined by the two levels associated with the pre-etching elements.

The advantage takes advantage of this phenomenon.

According to the main feature of the invention, virgin areas free from any recording, including pre-etching in the form of smooth grooves or sections, are provided along the tracks.

These areas must have a configuration such that the smallest of the dimensions thereof is greater than the largest of the dimensions of the track scanning spot, when the spot is focussed in the plane of the surface of these zones. Furthermore, the pitch between two tracks, i.e. the intertrack distance must be greater than the dimension of the spot following this direction.

While respecting this condition, the invention may be implemented according to two main methods, themselves susceptible of several variations.

In a first method, if the recording density is not critical, the virgin areas may be interlaced with the etchings representing the data. For that, the track zones defined by two successive etching elements may be used. For that the track must not be materialized by a pre-etching in the form of a smooth groove. Other conditions must also be complied with: the etched patterns representing the data must be preferably smaller in area than the area of the scanning spot and leave sites between two successive etchings of a length greater than this spot. The location of these sites may be systematic and formed between two positions reserved for etching or, on the contrary, the sites may be spaced apart in a more random fashion.

According to a second method of implementation, which forms a preferred method, specific sites are provided along the tracks and these sites are preceded by flags, i.e. discrete pre-etching elements synchronizing the beginning of the virgin areas intended solely for the purpose of generating a focussing signal. These flags must be selectively detectable. For this, they may be associated with a specific code, for example be formed by a succession of pre-etching sections whose respective dimensions and/or spatial distribution distinguish them from the codes associated with the other etching elements, particularly the codes associated with the useful recorded information data.

Figure 4:
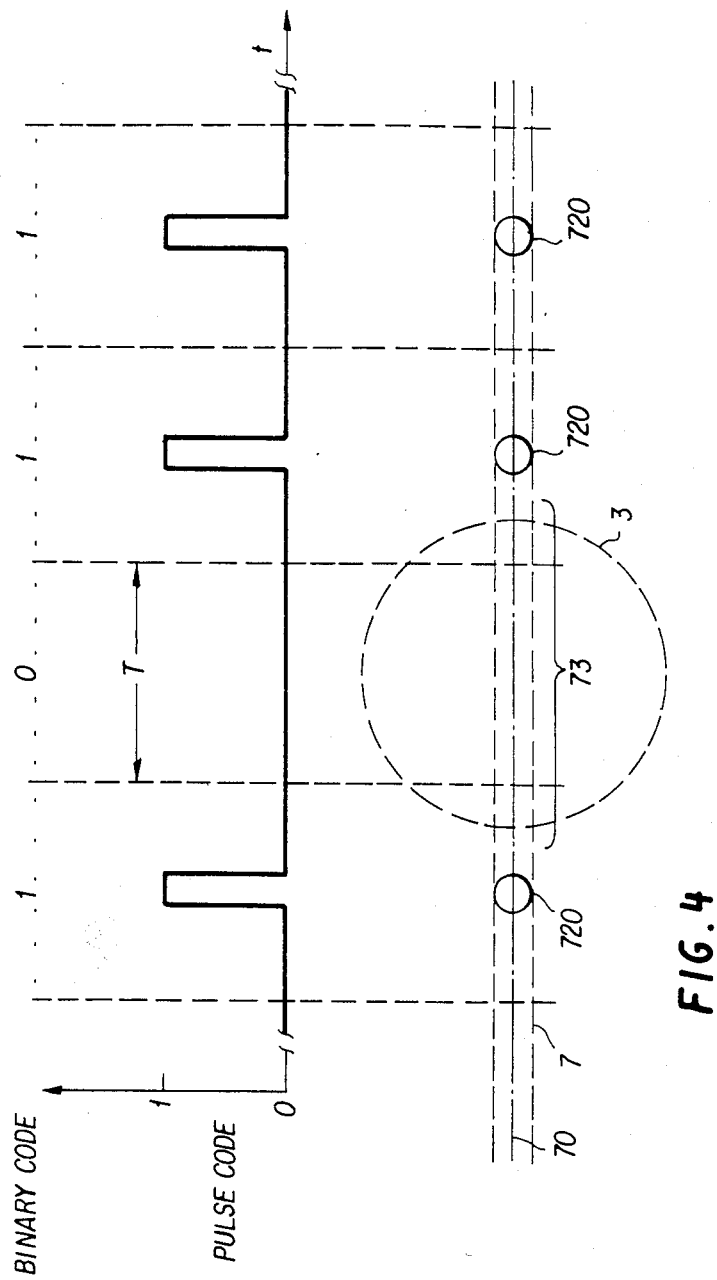
FIG. 4 is one example of coding data on a disk which may be used by the process of the invention in a first method of implementation.

FIG. 4 shows one example of data recording whose configuration allows a variation of the first method of implementation.

A four bit binary word of arbitrary configuration "1 0 1 1" will be taken as example. One category of code among others able to satisfy the previously mentioned requirements is the pulsed code. The logic states "1" are represented by a short positive pulse which will result in an etching element 720 of small dimension created along track 7 and centered on the mean axis 70. In the diagram of FIG. 4 showing the pulsed code, the time interval T corresponds to the basic period for recording a binary element or bit, taking into account the travelling speed of the data carrier. The logic states "0" result in the absence of etching on the track and merge with the remaining areas of the carrier, particularly the intertrack areas, this of course if the track does not comprise a smooth pre-etched groove which forms one of the requirements to be respected.

It will be readily understood that if the distance separating two etchings 720 is greater than the scanning spot 3 focussed on the reference plane formed by the surface of the thermo-optical material layer covering the carrier, areas 73 corresponding to the recording of logic states "0" extending possibly over the two adjacent areas outside etching 720 may be used for generating control signals for focussing.

Figure 5:
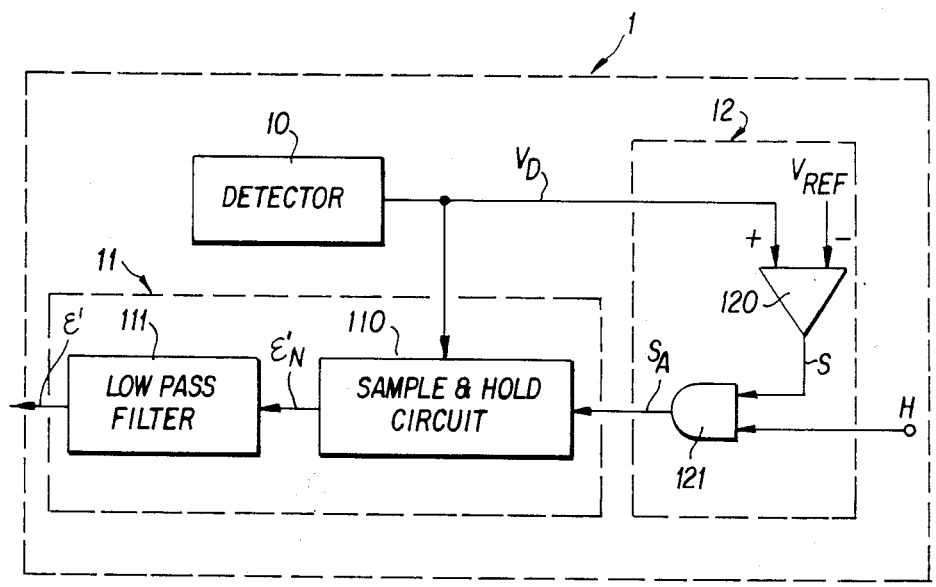
FIG. 5 is an electric diagram of a focussing device for putting into practice this first method of implementation.

FIG. 5 shows opto-electronic circuits for generating the vertical control signals $\epsilon'$. These circuits may be inserted in systems similar to the one described with reference to FIG. 1 and are located in the control block bearing the reference 1 in this figure. Only the vertical control circuits are specific to the invention, the other circuits are common to the prior art and do not require any special description.

The circuits comprise an opto-electronic detection member which will be described in detail further on. This member, which detects the radiation coming from the area illuminated by spot 3, comprises at least one photodetecting cell delivering an output signal $V_D$ transmitted to circuits 11 for elaborating a vertical control error signal $\epsilon'$ and to sampling circuits 12. The purpose of these latter is to generate operation enabling signals transmitted to circuits 11 centered on the time intervals corresponding to recording of logic states "0", i.e. track areas 7 without etchings greater than the scanning spot 3 (FIG. 4). For this, the sampling circuits 12 comprise a comparison means 120 with a threshold $V_{REF}$. This latter circuit may be formed by a differential input amplifier which receives on its direct(+) and inversion (−) inputs respectively the signals $V_D$ and $V_{REF}$ and which delivers an output signal S, e.g. at logic state "1", when the detected signal $V_D$ passes below a given threshold. Signal S is fed to one of the inputs of an AND logic gate 121. The other input receives clock pulse signals H centered on the middle of periods T (FIG. 4). For this, these clock signals may be derived from conventional socalled "bit" clock signals which are used in systems for writing/reading digital data. These signals define precisely the basic period T and synchronize the writing or the reading of data. In particular, since the logic states "0" are not associated with any etching, these signals are required for distinguishing the absence of etching corresponding to a "0" from the other areas without etching. When there is concordance between a logic state "0" and the appearance of a clock pulse H, an enabling signal $S_A$ is present at the output of the AND gate 122. This signal $S_A$ defines an analysis window and enables signal $V_D$ to be taken into account by the circuits for elaborating the error signal $\epsilon'$ within the time interval of the analysis window. These circuits may be formed in the example illustrated to FIG. 4 by a samplerdisabler element 110 storing the signal $V_D$ between two samples that is to say between the passages through the area illuminated by the scanning spot 3 of two areas without etching such as defined above. The output signal of $\epsilon'_N$ is then a staircase signal. To be usable, it must be "smoothed", for example by means of a low-pass filter 111 delivering at its output the error signal $\epsilon'$ transmitted to the vertical control means of lens $O_b$, that is essentially to coil B.

Figure 6:
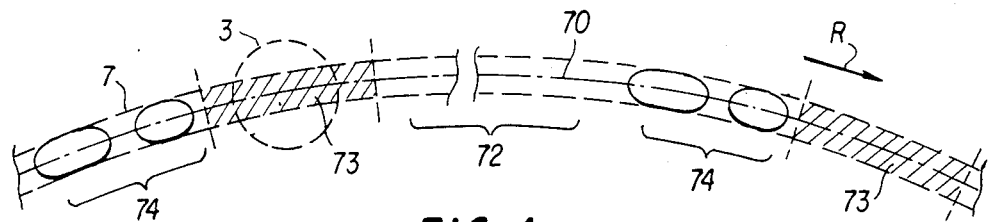
FIGS. 6 and 7 illustrate two variations of the configuration of a disk according to a second method of implementation of the process of the invention.

FIG. 6 illustrates a first variation of the second preferred method of implementing the invention. Sites formed by virgin areas 73 are provided along tracks 7 and are associated with flags 74 which precede them. If the radial control is provided by detecting specific flags, these flags may be used within the scope of the invention instead of flags 74 and thus play a double role while avoiding the reduction in recording density resulting from the recording of additional flags.

Figure 3:
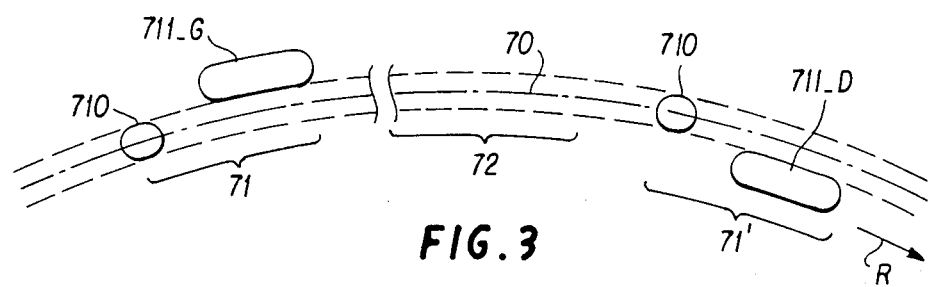

The flags may be of any type and, without this being limiting, are formed for example according to any one of the main variations illustrated in FIGS. 2 and 3. The only restriction is that these flags must be selectively detectable among all the etching configurations present on the disk.

Although hatched in FIG. 6 for the sake of illustration, it should be understood that the limits of the virgin areas 73 in directions other than those of the mean axis are virtual. These limits are moreover not critical. It is sufficient for the intertrack pitch to be greater than the dimension of the scanning spot 3 in a radial direction.

Figure 7:
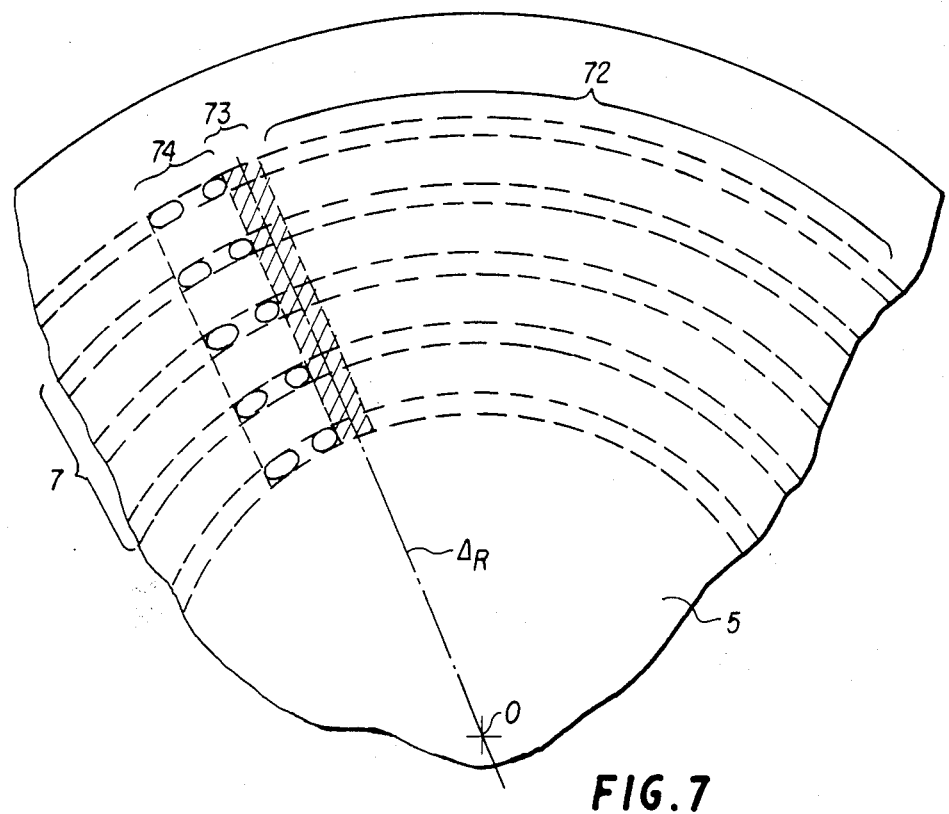

FIG. 7 illustrates a second preferred variation of the same method of implementation. In this variation, the disk is divided into sectors and all the areas 73, as well as the associated flags 74, are aligned along radial axis $\Delta_R$ passing through the center of rotation of disk 5. For the sake of simplicity, only five concentric tracks 7 have been shown. Along axis $\Delta_R$, all the virgin areas 73 merge into a single area having the shape of a right-angled quadrilateral whose largest dimension is parallel to axis $\Delta_R$.

Actually, as has been pointed out, a disk 30 cm in diameter comprises about 40,000 tracks spaced apart in a ring 8 cm wide or useful recording zone. Each track comprises about 3500 virgin areas and as many associated flags. This arrangement has the advantage of allowing a reduced intertrack pitch, i.e. a greater recording density. In fact, the scanning spot 3 may extend on to an adjacent track without risk of intercepting an etching element of this track. Focussing is then made entirely independent of radial tracking errors.

Figure 8:
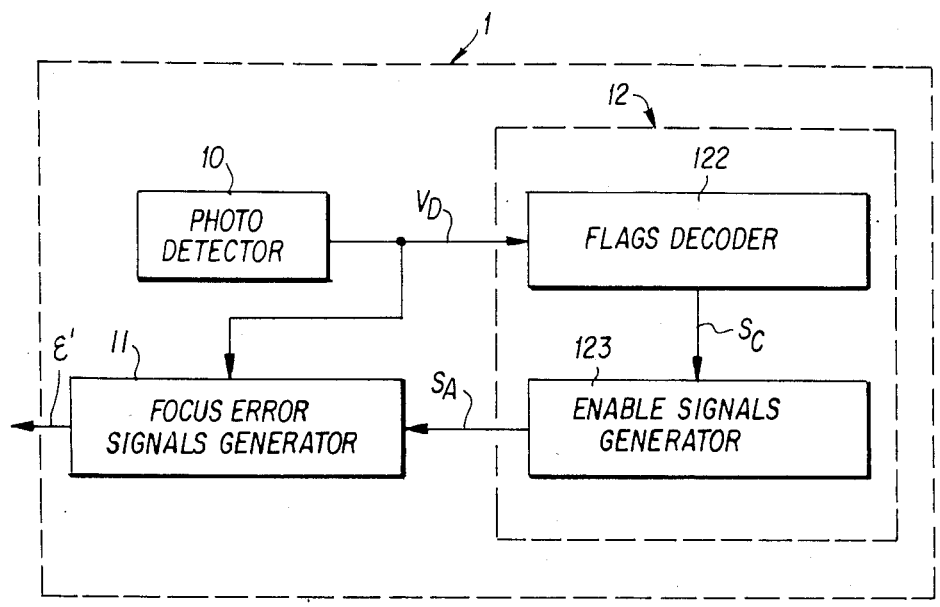
FIG. 8 is an electric diagram of a focussing device for putting into practice this second method of implementation.

FIG. 8 shows an example of circuits for elaborating the signal $\epsilon'$ adapted to the preferred method of implementing the invention.

Besides detector 10 and generator 11 generating the error signal $\epsilon'$ which are common to the circuits described with reference to FIG. 5 and which will not be described again, they also comprise sampling circuits 12 delivering the enabling signal $S_A$ and receiving the signal $V_D$ delivered by the detector 10. However, within the scope of the preferred method, these circuits comprise a flag identification circuit 122, for example a logic decoder recognizing the specific code associated with flags 74 preceding the virgin areas 73 and delivering an initialization signal $S_C$, for example pulsed, initializing a generator 123 generating the enabling signal $S_A$. This latter may be advantageously formed from one-shot flip-flops initialized by one of the transitions of signal $S_C$ and delivering an output signal defining an analysis window of width $\theta$ and sufficiently delayed so that, considering the travelling speed of the tracks in the zone illuminated by the scanning spot 3, this latter is centered on the virgin area 73 at the time when the enabling signal $S_A$ is generated and, correlatively, the measurement is taken into account by the sampler-disabler 110.

In all the variations which have just been described, the sampling-disabling (FIG. 5: circuit 110) may be replaced by peak detection or integration also followed by a comparison of one pulse with the other, generation of a staircase signal $\epsilon'_N$ and smoothing so as to obtain the final signal $\epsilon'$.

The process which has just been described in its two main embodiments is compatible with all the tracking and data reading processes. It may be in particular used in a monotrack-monobeam system. In this case, the single beam serves for writing, for providing radial tracking preferably by using the flags 74 and for generating the vertical control signal $\epsilon'$ in accordance with the teaching of the invention. The opto-electronic means used in these processes may also be used for generating signal $V_D$.

Detection may be made in accordance with numerous known processes. By way of examples, a device may be used of assymetric type according to the teaching of the patent U.S. Pat. No. 4,079,248 or of an astigmatic type according to the teaching of patent U.S. Pat. No. 4,023,033.

To illustrate the invention in a concrete way, the operation of an astigmatic device cooperating with the device of FIGS. 5 or 8 will be described with reference to FIGS. 9 to 10, this description relating to a monotrackmonobeam system.

Figure 9:
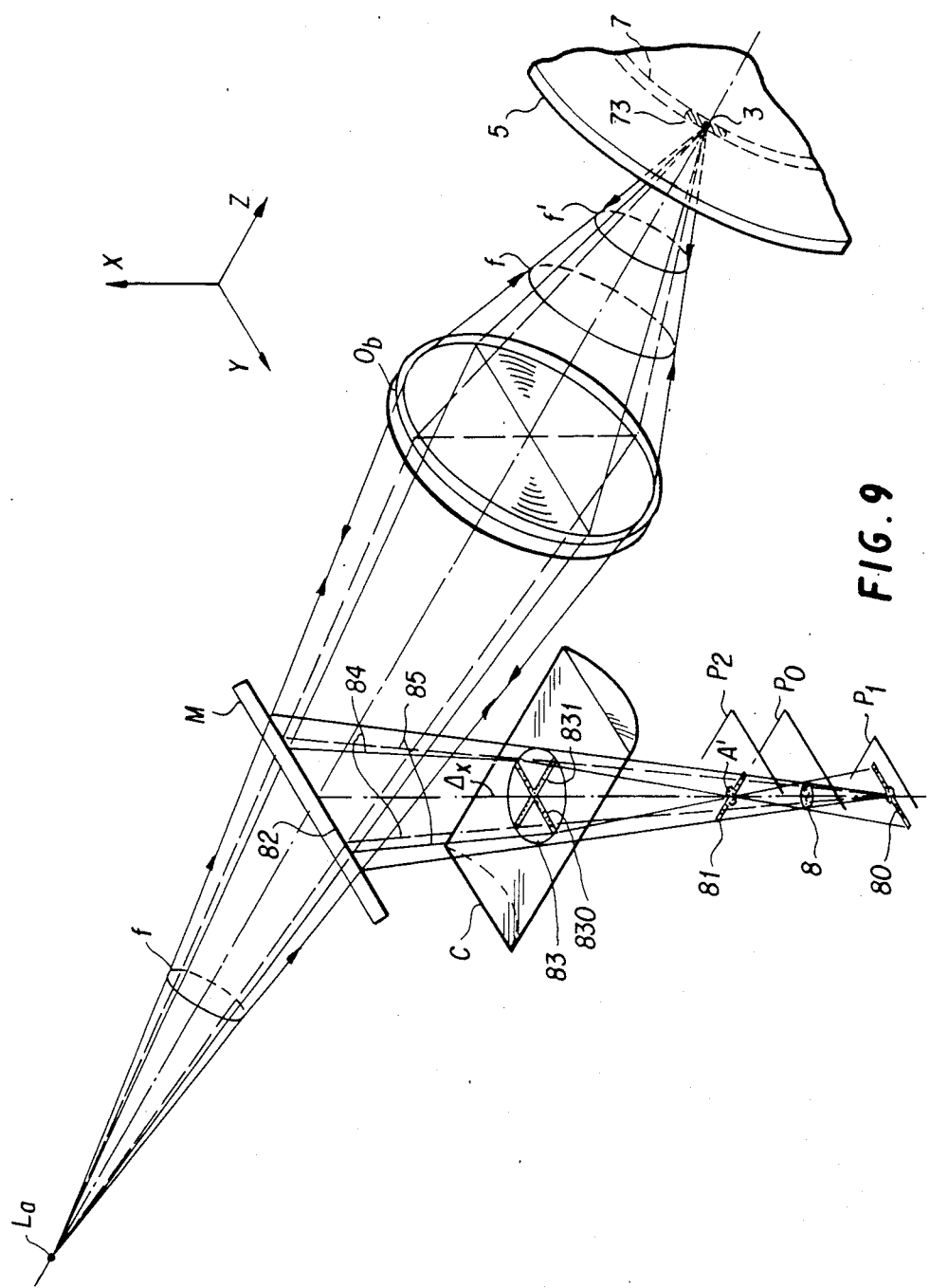
FIGS. 9 and 10 show in detail opto-electronic means usable in both methods of implementation.

In FIG. 9 are shown a radiated energy source $L_a$ emitting a beam f along axis OZ of an orthonormed reference OXYZ; means M for separating the radiated energy, such as a semitransparent mirror forming with axis OZ an angle of $\pi/4$ radians for example; a lens $O_b$ with optical axis Ox causing the beam f to converge into a spot 3 on carrier 5. The source $L_a$ may be considered as being a pin-point. It is for example the emissive face of a laser diode.

A fraction at least of beam f is reflected by carrier 5, this reflected beam passes through lens $O_b$ then is reflected by the semi-transparent mirror M to converge at a point A, symmetric with source $L_a$ with respect to the mirror M, situated on an axis $\Delta_X$ parallel with OX; through point A passes a plane normal to the axis $\Delta_X$ referenced $P_1$. An optical device is placed along axis $\Delta_x$ for making the optical assembly placed in the path of the reflected beam f astigmatic; such a device may be formed by a cylindrical lens, the axis of the cylinder being for example chosen parallel to axis OZ. As is known, the purpose of the cylindrical lens C is to cause a straight line segment 80 to correspond with the pinpoint source $L_a$ on each side of point A in plane $P_1$, parallel to axis OY in the example shown in the figure. In the drawing the traces 82, 83, which are substantially circular, of the reflected beam $f_I$ are shown schematically on mirror M and on the cylindrical lens C, as well as the diameters 830 and 831 respectively; rays 85 define the segment 81 after convergence at a point A' on axis $\Delta_X$ in plane $P_2$; the rays converge at point A. A plane of observation $P_0$ has been chosen; the plane $P_0$ is situated on axis $\Delta_X$ between points A and A' where the surface of spot 8 is minimum the plane $P_0$ is orthogonal to axis $\Delta_x$.

What has been described above corresponds to the case where beam 3 is correctly focussed on carrier 5 at point 3.

In the opposite case, there is formed in plane $P_0$ a focussed spot which is deformed with respect to spot 8 by elongation in directions parallel to axes OY or OZ depending on whether beam f converges in front of or behind the reference surface of disk 5, i.e. within the scope of the invention of the surface of the virgin areas 73.

Figure 10:
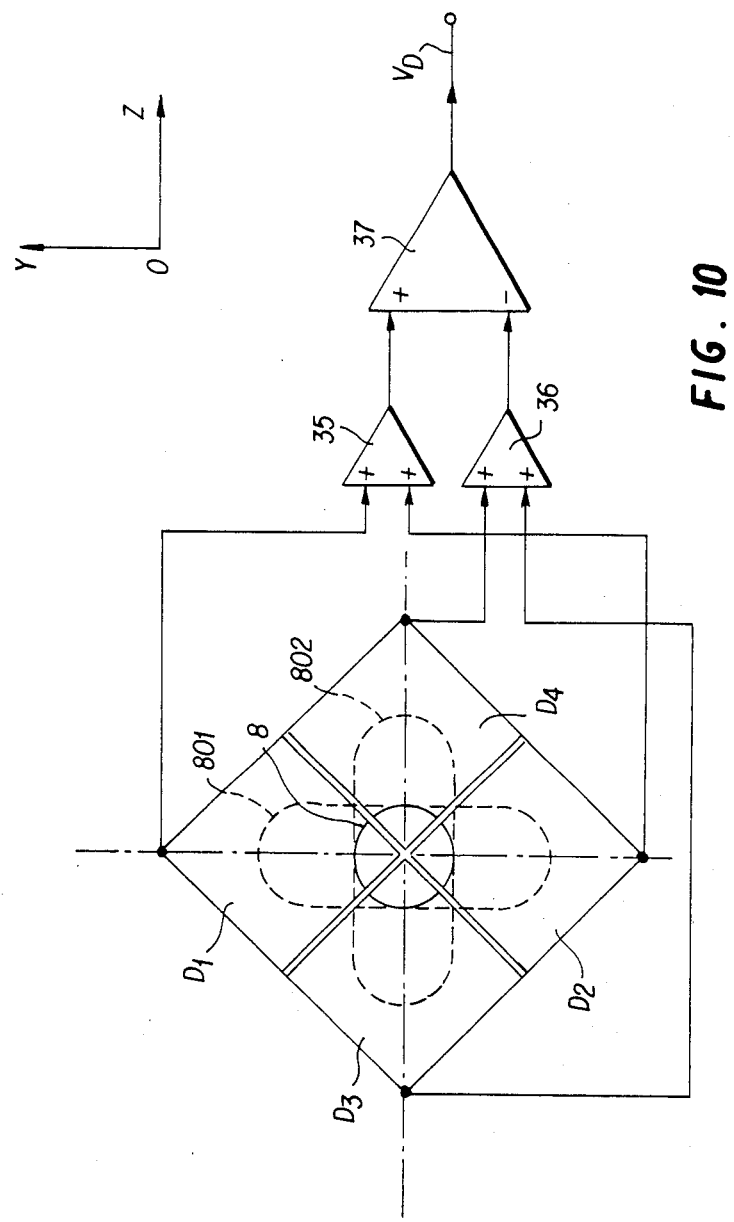

In the observation plane $P_0$ are placed means for detecting the shape of the focussed spot, these means being for example formed by photo-electric cells as illustrated in FIG. 10 delivering a focussing check signal. The detection means comprise in this embodiment four photo-electric cells $D_1, D_2, D_3, D_4$ placed in a square whose diagonals are parallel to axes OY and OZ, and placed so that the focussed spot 8 is formed substantially in the middle of the square.

The cells belonging to the same diagonal are connected to the inputs of an adder; i.e. in FIG. 10 cells $D_1$ and $D_2$ on the diagonal parallel to axis Oy to the inputs of adder 35 and the cells $D_3$ and $D_4$ on the other diagonal to the inputs an adder 36. The adders are connected to a differential amplifier 37: adder 35 to the positive input of the amplifier and adder 36 to its negative input. At the output of amplifier 37 is available the electric signal $V_D$ which forms the focussing check signal.

The three shapes of focussing spots likely to be formed in the observation plane $P_0$ are shown in FIG. 10: the contour 8, of minimum area mentioned above; a contour 801 elongated along axis OY and a contour 802 elongated along axis OZ. It is clear that, taking into account the above indicated connection of the photo-electric cells, signal $V_D$ is zero when focussing is correct (spot 8 substantially circular), positive when the surface of areas 73 has moved away from lens $O_b$ (spot 801) and negative when the surface of areas 73 has drawn near lens $O_b$ (spot 802).

By this process, the signal $V_D$ is representative of the focussing error of beam f, in amplitude and in sign. According to the invention, the signal $V_D$ is sampled during the analysis window and stored between two samples by devices which have been described with reference to FIGS. 5 and 8.

Figure 11:
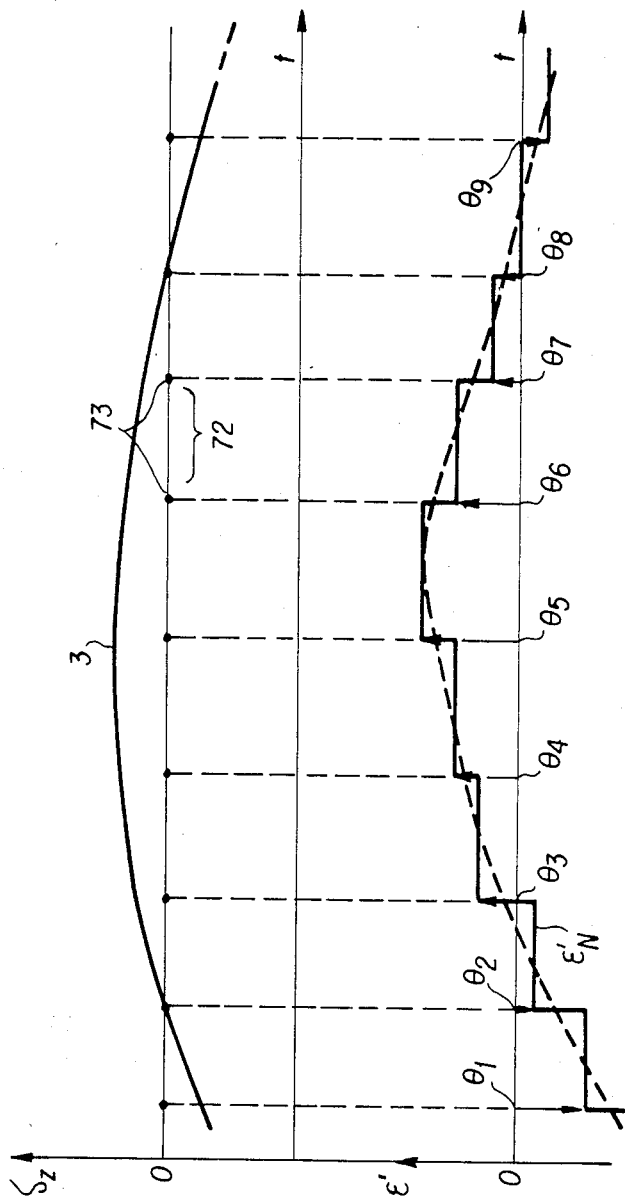
FIG. 11 is a diagram for explaining the operation of the device of the invention according to the second method.

The diagram of FIG. 11 illustrates one example of evolution of the vertical control error signal $\epsilon'$ as a function of time. This example relates more particularly to the case of the second method of implementation. The curve of the upper part of the diagram represents the position $\epsilon_Z$ along a vertical coordinate axis of the scanning spot 3 with respect to the reference plane, of zero altitude, formed by the surface of the virgin areas 73. Curve $\epsilon'$ on the lower part of the diagram represents schematically the corresponding evolution as a function of time of the smoothed focussing error signal $\epsilon'$. The analysis windows corresponding to the passages of the virgin areas through the zone illuminated by the scanning spot 3 are shown in a simplified way as virgin areas by points referenced $\theta_1$ to $\theta_9$. In the same diagram is shown the staircase curve of signal $\epsilon'_N$ such as stored between each passage of the virgin areas 73. The time interval elapsing between two analysis windows depends on the speed of rotation of the disk and on the length of the zones 72.

More briefly, the second process of the type described in the first mentioned French patent consists, after introducing a disymmetry into the scanning beam, in forming the image of the focussing spot on photo-electric cells at least two in number and in measuring the distorsions of this image. The signals delivered by the photo-electric cells depend on the deviation existing between the focussing plane and the reference plane formed within the scope of the present invention by the surface of the virgin areas.

For intializing the focussing device, a process similar to that described in patent U.S. Pat. No. 4,128,847 may be used.

Generally, the loop of the focussing control circuits is open and a saw-tooth signal is transmitted to one of the solenoids with which the means for controlling the vertical position of lens $O_b$ are provided, for example solenoid B in FIG. 1 or else an additional solenoid specific to this purpose. The lens will then move from a rest position to a position in which the focussing spot is located in a plane close to the reference plane such as it has been defined.

In a first variation, if the spot has a radial dimension at least of the same order of size as the width of the intertrack zones, whatever its radial position, the flag identification circuits 122 of the device described with reference to FIG. 8 will begin to produce control signals $S_C$ whose instant of appearance may be used for generating a vertical control loop closure signal. The spot is then situated in a plane sufficiently close to the reference surface for the vertical control circuits to be "latched" on to this surface.

In another variation, if the spot has a radial dimension smaller than the width of the intertrack zones or else in the first method of implementation, the value of the amplitude of signal $V_D$ may be used compared to a reference threshold for generating a vertical control loop closure signal.

Should accidental loss of focussing occur, the same procedures may be used according to the teaching of the aobve-mentioned patent application.

The invention is not limited to the embodiments which have been described and particularly to the devices for implementing the process described with reference to FIGS. 5 to 8.

What is claimed is:

1. A data carrier comprising a reference surface wherein prerecorded marks are arranged for materializing the mean axis of a track divided into a plurality of adjacent track elements forming an array of substantially uniform pitch; said track elements being lengthwise partitioned into discrete recording sites forming zones allotted to the storage of useful data; said zones being separated from one another by flag means made of said prerecorded marks and repeatedly arranged along said track; said reference surface having a smooth separating domain in the form of a land, the inner boundaries of said land being non-contiguous, closed outlines which delimit said prerecorded marks and the ones of said discrete recording sites postrecorded along said track; said land filling a gap between one of said closed outlines and the next one along said mean axis; said gap situated between said zones being in predetermined positional relationship with said flag means; the smallest dimension of said gap being greater than said pitch.

2. Data carrier as claimed in claim 1, wherein said land fills further gaps arranged in said zones between postrecorded sites representing in coded fashion said user data; at least one of said further gaps having a smallest dimension greater than said pitch.

3. Data carrier as claimed in claim 1, wherein two successive prerecorded marks in said flag means are separated by said gap.

4. Data carrier as claimed in claim 1, wherein said gap is located at an end of said flag means.

5. Data carrier as claimed in claim 1, wherein said gap located on said mean axis of said track is repeatedly provided at the same location on track elements arranged next to one another for forming a gap alignment orthogonal to said mean axis.

6. Data carrier as claimed in claim 1, wherein said mean axis is curved; said track having concentric turns.

* * * * *